US007465076B2

(12) United States Patent
Suzuki

(10) Patent No.: US 7,465,076 B2
(45) Date of Patent: Dec. 16, 2008

(54) VEHICLE HEADLIGHT

(75) Inventor: Eiji Suzuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 11/730,429

(22) Filed: Apr. 2, 2007

(65) Prior Publication Data

US 2007/0247864 A1 Oct. 25, 2007

(30) Foreign Application Priority Data

Apr. 21, 2006 (JP) ............................ 2006-118245

(51) Int. Cl.
*B60Q 1/00* (2006.01)

(52) U.S. Cl. ...................................... 362/359; 362/351

(58) Field of Classification Search ................. 362/538, 362/539, 351, 352
See application file for complete search history.

(56) References Cited

U.S. PATENT DOCUMENTS 5,307,247 A * 4/1994 Cejnek ....................... 362/539
6,428,194 B1 * 8/2002 Oschmann et al. .......... 362/507
6,494,603 B1 * 12/2002 Takada ....................... 362/538
2001/0021113 A1 * 9/2001 Eichler ....................... 362/539
2002/0181246 A1 12/2002 Takada et al.

FOREIGN PATENT DOCUMENTS

EP 1 201 989 A2 5/2002
EP 1 640 658 A2 3/2006
GB 2 179 132 A 2/1987
JP 6-50106 U 7/1994

* cited by examiner

*Primary Examiner*—Anabel M Ton
*Assistant Examiner*—Julie A Shallenberger
(74) *Attorney, Agent, or Firm*—Foley & Lardner LLP

(57) ABSTRACT

A vehicle leadlight includes a light source, a reflector, a projector lens, and a shade member. The shade member includes a first plate member and a second plate member. The first plate member has an edge that is shaped to increase amounts of light around cut-off lines of a light distribution pattern. The second plate member is bent to have the substantially similar shape to a meridional image surface of the projector lens. The second plate member has an edge that is shaped to create the cut-off lines of the light distribution pattern.

4 Claims, 9 Drawing Sheets

VEHICLE HEADLIGHT

CROSS-REFERENCE TO RELATED APPLICATIONS

The present document incorporates by reference the entire contents of Japanese priority document, 2006-118245 filed in Japan on Apr. 21, 2006.

BACKGROUND OF THE INVENTION

1. Field of the Invention

The present invention relates to a projector-type vehicle headlight.

2. Description of the Related Art

A conventional projector-type vehicle headlight is disclosed in Utility Model Laid-Open No. H06-50106. The conventional (vehicle headlight includes a light source (such as a bulb), a reflector (such as a concave mirror), a projector lens (such as a convex lens), and a shade. Light emitted from the light source is reflected to the projector lens by the reflector. The projector lens projects the reflected light in front of a vehicle. The shade has the shape along a meridional image surface that is generated by the projected light from the projector lens. The shade creates a certain light distribution pattern including a cut-off line (a cut line) that blocks a portion of the reflected light from the reflector to the projector lens. An operational mechanism of the conventional vehicle headlight is described below. When the light source lights up, light emitted from the light source is reflected to the shade and the projector lens by the reflector. The shade blocks a portion of the reflected light. The rest of the reflected light, which is not blocked by the shade, is projected forward the vehicle in the certain light distribution pattern including the cut-off line by the projector lens.

It is desirable that a vehicle headlight has lower production costs. One approach is to make the shade from a thin steel sheet instead of aluminum die-casting alloy. However, if the thin steel sheet is simply flat, a linear edge of the shade does not match with a curve of the meridional image surface of the projector lens. On the other hand, if the edge of the shade is overlapped with the meridional image surface at those center portions, gaps occur between the edge and the meridional image surface at both sides that leads to occurrence of blurs at the both sides of the cut-off line of the light distribution pattern. Moreover, amounts of light are not even by positions of the light distribution pattern. Namely, amounts of light at the both sides of the cut-off line are smaller than that for the center portion. Therefore, it may happen that enough amounts of light cannot be obtained at the both sides of the cut-off line. FIG. 9 depicts iso-illuminance curves (iso-intensity curves) that are obtained by using vehicle headlights according to the conventional technique and an embodiment of the present invention. A dashed-two dotted line represents an iso-illuminance curve for the conventional vehicle headlight. A solid line (the outermost solid line) represents an iso-illuminance curve for the vehicle headlight according to the embodiment of the present invention. It can be seen that, the iso-illuminance curve indicated by the dashed-two dotted line is narrower than the same for indicated by the outermost solid line.

A reason why the edge of the shade is overlapped with the meridional image surface at those center portions is described below. If the edge is overlapped with the meridional image surface at those both sides, a gap occurs between the edge and the meridional image surface at the center portions that leads to occurrence of a blur at the center portion of the cut-off line. Therefore, the shape of the cut-off line at the center portion becomes unclear. Moreover, an amount of light at the center portion of the cut-off line in the light distribution pattern becomes larger than the same for on the both sides that disadvantageously leads to generation of glare at the center portion of the cut-off line. In consideration of these facts, it is common in vehicle headlamps to overlap the edge with the meridional image surface at those center portions.

One approach to overcome the shortage of the amounts of light at both the sides of the cut-off line could be to bent downward both ends of the edge, thereby increasing the amounts of light around the both sides of the cut-off line. However, in this approach, both the ends of the cut-off line are lifted upward, which can lead to generation of glare at the both ends of the cut-off line. Especially, in the vehicle headlight being compatible with the adaptive front-lighting system (AFS) that has been adopted in recent years, the possibility of generation of glare increases remarkably because a lighting direction in the light distribution pattern rotates from side to side as a lamp unit rotates around a vertical axis (for example, a vertical axis V-V shown in FIGS. 2 and 11) when the vehicle is turning.

One approach is to make the shade, which is made of thin steel sheets, curved along the meridional image surface. However, production costs of such a shade increases, because the production design becomes complicated to have the curve along the meridional image surface.

SUMMARY OF THE INVENTION

It is an object of the present invention to at least partially solve the problems in the conventional technology.

According to an aspect of the present invention, a projector-type vehicle headlight includes a light source that emits light; a reflector that reflects the light emitted by the light source; a projector lens that projects forward the light reflected by the reflector; and a shade member that blocks a portion of the light reflected by the reflector so that the light does not reach to the projector lens thereby creating a light distribution pattern that includes cut-off lines. The shade member includes at least a first plate member and a second plate member, the first plate member being located relatively nearer to the reflector and the second plate member being located relatively nearer to the projector lens. The first plate member has an edge that increases amounts of light around the cut-off lines of the light distribution pattern. The second plate member is bent to have an approximately similar shape to a meridional image surface of the projector lens, and has an edge that creates the cut-off lines of the light distribution pattern.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments explained below. Incidentally, a vehicle headlight according the embodiments is used for the left-hand traffic. However, the structure of the vehicle headlight can be changed to a bilaterally-symmetric structure to use the vehicle headlight for the right-hand traffic.

In the embodiments and claims, "front, back, up, down, left, and right" respectively denote the front, back, up, down, left, and right sides of a vehicle that includes the vehicle headlight. In the accompanying drawings, "F" and "B" respectively denote the forward (forwarding) and backward directions of a car (vehicle) C. Then, "U" and "D" respectively denote the upward and downward directions viewed from driver's eyes. Furthermore, "L" and "R" respectively denote the leftward and rightward directions viewed from the driver's eyes. "VU-VD" denotes a vertical line that runs up and down a screen. "HL-HR" denotes a horizontal line that runs right and left the screen. "Z-Z" denotes an optical axis of a reflector or a projector lens.

A vehicle headlight 1 according to a first embodiment of the present invention is described in detail below with reference to FIGS. 1 to 9. First, a configuration of the vehicle headlight 1 is described below with reference to FIGS. 1 and 2. The vehicle headlight 1 is, for example, a projector-type headlamp, and provided to the right and left sides of a front part of a car (vehicle) C.

The vehicle headlight 1 lights in a light distribution pattern that includes an oblique cut-off line CL1, an upper-horizontal cut-off line CL2, and a lower-horizontal cut-off line CL3. The light distribution pattern can be a light distribution pattern for oncoming cars LP. The oblique cut-off line CL1 extends obliquely between the upper-horizontal cut-off line CL2 and the lower-horizontal cut-off line CL3. The upper-horizontal cut-off line CL2 horizontally extends from the left end of the oblique cut-off line CL1. The lower-horizontal cut-off line CL3 horizontally extends from the right end of the oblique cut-off line CL1. The upper-horizontal cut-off line CL2 is located higher than the lower-horizontal cut-off line CL3.

Figure 1:
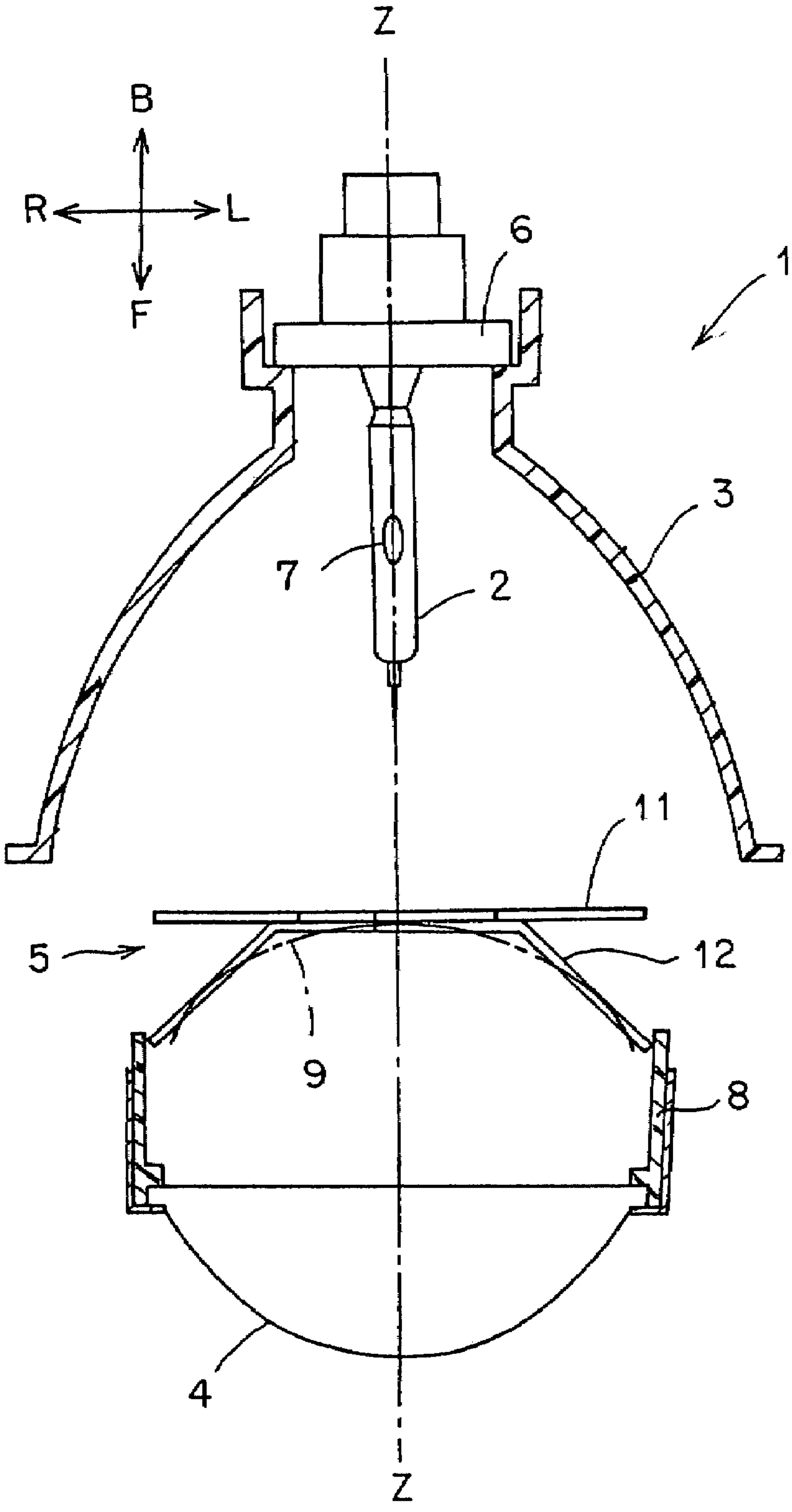
FIG. 1 is a horizontal cross-sectional view of a vehicle headlight according to a first embodiment of the present invention.
Figure 2:
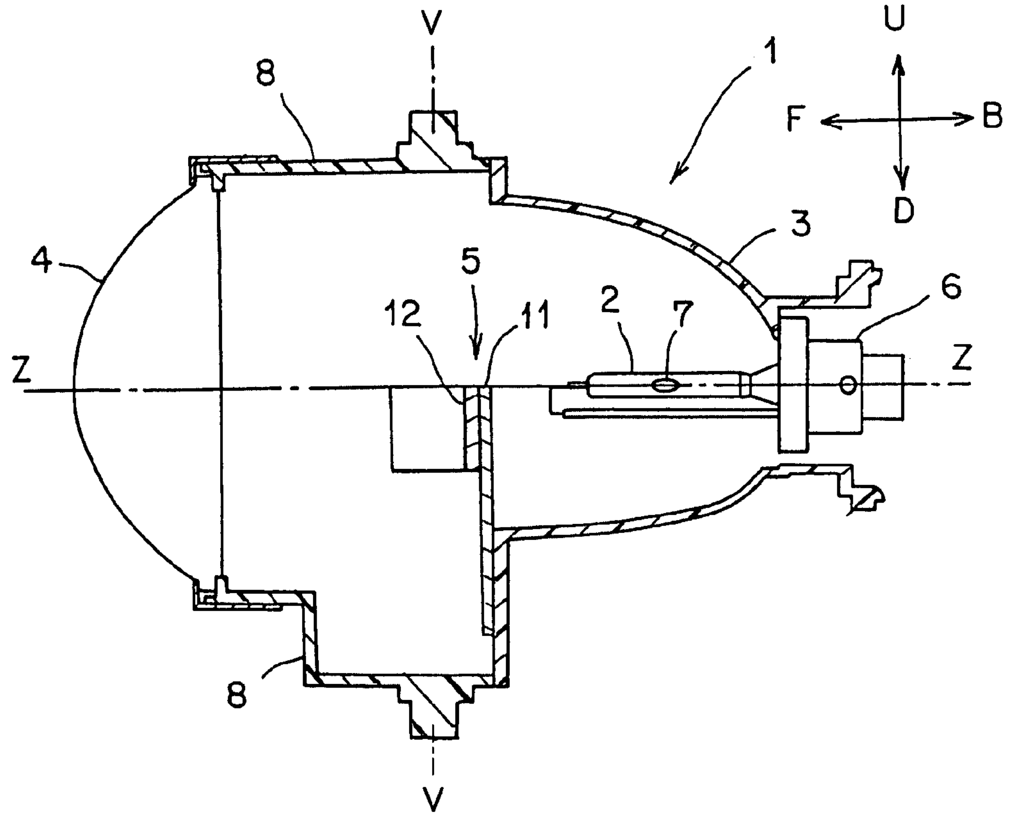
FIG. 2 is a vertical cross-sectional view of the vehicle headlight according to the first embodiment.

As shown in FIGS. 1 and 2, the vehicle headlight 1 includes a discharge lamp 2 as a light source, a reflector 3, a projector lens (a condenser lens) 4, a shade 5, a lamp housing (not shown), and a lamp lens (not shown).

The lamp room, which is space inside the vehicle headlight 1, is formed by the lamp housing and the lamp lens. A lamp unit is formed by the discharge lamp 2, the reflector 3, the projector lens 4, and the shade 5. The lamp unit is located inside the lamp room. The lamp unit is rotatable around a vertical axis V-V. A swivel mechanism (not shown) rotates the lamp unit. Moreover, an optical-axis adjusting mechanism (not shown) can adjust an optical axis of the lamp unit.

The discharge lamp 2 is, for example, a high-pressure metal-vapor discharge lamp such as a metal halide lamp or a high-intensity discharge (HID) lamp. The discharge lamp 2 is detachably attached to the reflector 3 via a socket mechanism 6. A light emitting portion 7 in the discharge lamp 2 is positioned substantially on or adjacent to a first focal point (not shown) of the reflector 3. Incidentally, instead of the discharge lamp 2, a semiconductor light source such as a halogen lamp, an incandescent lamp, or a light-emitting diode can be used as the light source.

A concave surface of the inside of the reflector 3 is finished with an aluminum coating by the aluminum evaporation or with a silver coating, thereby forming a reflecting surface thereon. The reflecting surface of the reflector 3 is in the form of an ellipsoid basis reflecting surface such as an ellipsoid of revolution or ellipsoid basis free-form surface (a non-uniform rational B-spline (NURBS) surface). Namely, a vertical cross-sectional surface of the reflector 3 shown in FIG. 2 is an ellipsoid surface, and a horizontal cross-sectional surface of the reflector 3 shown in FIG. 1 is a paraboloidal surface or a distorted paraboloidal surface. Because the reflector 3 has such a shape, the reflecting surface of the reflector 3 has two focal points (not shown): the first focal point located on the vertical cross-sectional surface, and a second focal point located on the horizontal cross-sectional surface. The reflector 3 is securely held by a frame member 8 such as a holder. Incidentally, the free-form surface (the NURBS surface) can be the surface described in "Mathematical Elements for Computer Graphics" written by David F. Roger and J. Alan Adams.

The projector lens 4 is formed by a convex aspheric lens that has a convex aspheric surface in the front side and a flat surface in the back side. The projector lens 4 is securely held by the frame member 8. The projector lens 4 has a meridional image surface 9 indicated by a dashed-dotted curved line shown in FIG. 1. The meridional image surface 9 is a focal plane in the object space, i.e., it is. located on or in front of (in the side of the projector lens 4) the second focal point of the reflecting surface of the reflector 3.

The shade 5 includes a first shade plate 11 on the back side and a second shade plate 12 on the front side. The first plate 11 and the second shade plate 12 are made of, for example, a flat thin steel sheet having thickness in the range of 1 millimeter to 3 millimeters. The production costs of such plates are very low. The first shade plate 11, which is located near the reflector 3 (and the discharge lamp 2), is secured to the reflector 3 and/or the frame member 8. On the other hand, the second shade plate 12, which is located near the projector lens 4, is secured to the first shade plate 11.

Figure 3:
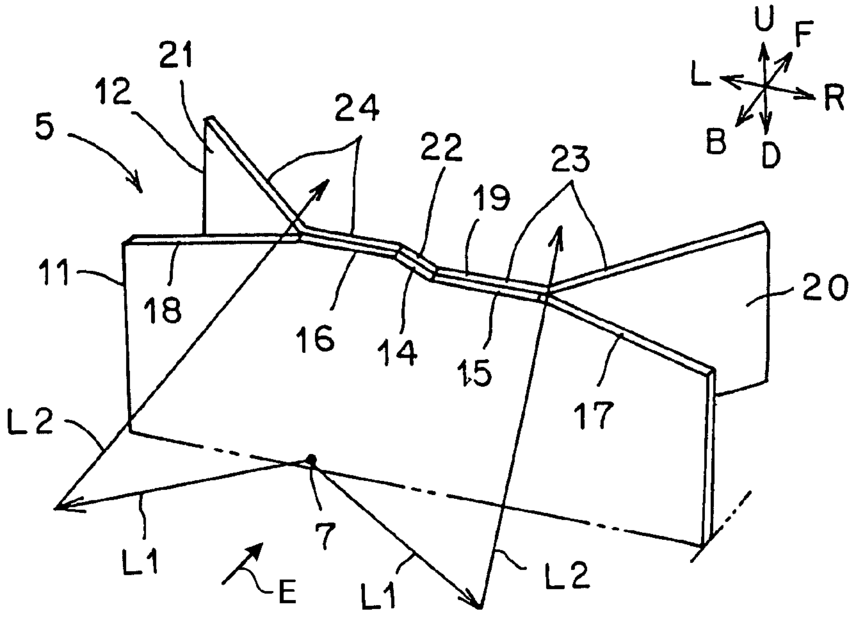
FIG. 3 is a perspective view of first and second shade plates shown in FIGS. 1 and 2.
Figure 4:
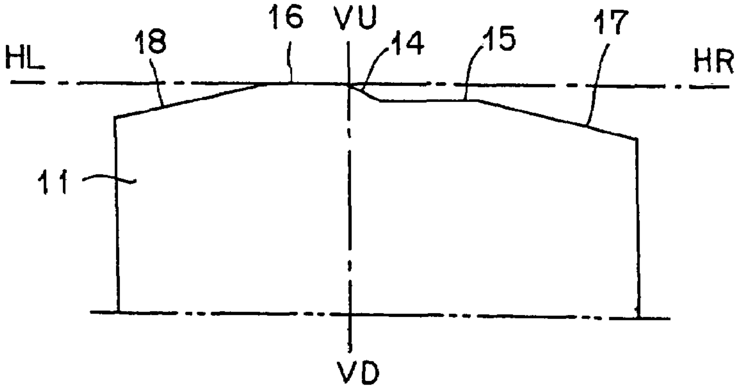
FIG. 4 is a view of the first shade plate viewed from a direction indicated by an arrow E shown in FIG. 3.
Figure 6:
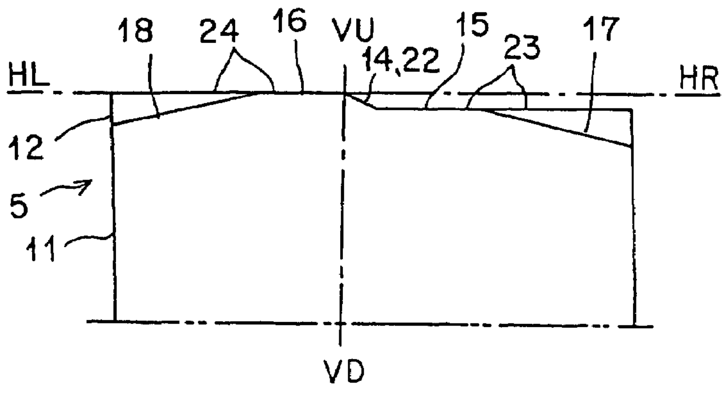
FIG. 6 is a rear view of the first and second shade plates viewed from the direction indicated by the arrow E shown in FIG. 3.

As shown in FIGS. 3, 4, and 6, the first shade plate 11 has edges on its top surface, i.e., an oblique edge 14, a lower horizontal edge 15, an upper horizontal edge 16, a right-side oblique edge 17, and a left-side oblique edge 18. The oblique edge 14 forms the oblique cut-off line CL1 of the light distribution pattern for oncoming cars LP. The lower horizontal edge 15 forms the upper-horizontal cut-off line CL2 of the light distribution pattern for oncoming cars LP. The upper horizontal edge 16 forms the lower-horizontal cut-off line CL3 of the light distribution pattern for oncoming cars LP. The right-side oblique edge 17 extends obliquely downward from the right end of the lower horizontal edge 15. The left-side oblique edge 18 extends obliquely downward from the left end of the upper horizontal edge 16.

Figure 8:
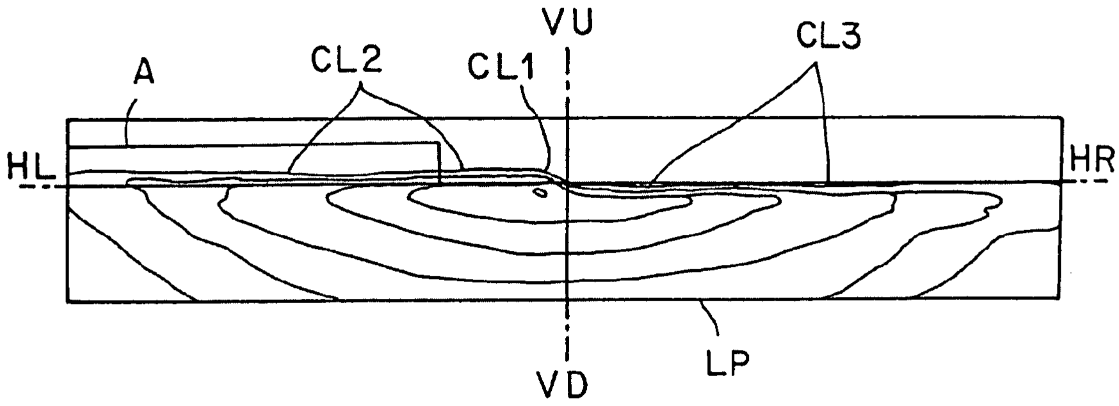
FIG. 8 is a schematic of a light distribution pattern for oncoming cars obtained by using the first and second shade plates shown in FIGS. 1 and 2.

The right-side oblique edge 17 is provided to increase an amount of light around the left side of the upper-horizontal cut-off line CL2 (an area surrounded by a rectangular frame A shown in FIG. 8). The left-side oblique edge 18 is provided to increase an amount of light around the right side of the lower-horizontal cut-off line CL3.

An intersection of the oblique edge 14 and the upper horizontal edge 16 on the first shade plate 11, i.e., an elbow point of the first shade plate 11 is located on or near an intersection of the vertical line VU-VD and the horizontal line HL-HR. The lower horizontal edge 15 is located on the right of the oblique edge 14. The upper horizontal edge 16 is located on the left of the oblique edge 14. The right-side oblique edge 17 is located on the right of the lower horizontal edge 15. The left-side oblique edge 18 is located on the left of the upper horizontal edge 16.

As shown in FIGS. 1 to 3, 5, and 6, the second shade plate 12 is bent to have the approximately similar shape to the meridional image surface 9 of the projector lens 4. The second shade plate 12 is formed by a center plate portion 19, a right-side plate portion 20, and a left-side plate portion 21. The right-side plate portion 20 and the left-side plate portion 21 are respectively located on the right and left side of the center plate portion 19, and bent inward from the center plate portion 19.

Figure 5:
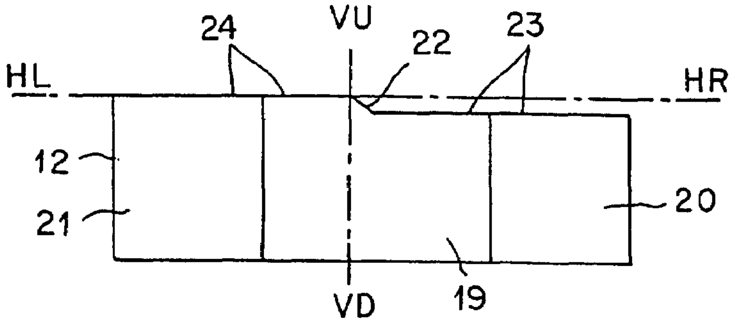
FIG. 5 is a view of the second shade plate viewed from the direction indicated by the arrow E shown in FIG. 3.

As shown in FIGS. 3, 5, and 6, the center plate portion 19, the right-side plate portion 20, and the left-side plate portion 21 have edges on their top surfaces, thereby forming the cut-off lines CL1, CL2, and CL3. An oblique edge 22 forms the oblique cut-off line CL1 of the light distribution pattern for oncoming cars LP. A lower horizontal edge 23 forms the upper-horizontal cut-off line CL2 of the light distribution pattern for oncoming cars LP. An upper horizontal edge 24 forms the lower-horizontal cut-off line CL3 of the light distribution pattern for oncoming cars LP.

An intersection of the oblique edge 22 and the upper horizontal edge 24 on the second shade plate 12, i.e., an elbow point of the second shade plate 12 is identical or substantially identical in shape and elevation to the elbow point of the first shade plate 11, and located on or near the intersection of the vertical line VU-VD and the horizontal line HL-HR. The shape of the lower horizontal edge 23 is identical or substantially identical to that of the lower horizontal edge 15 on the first shade plate 11, and located on the right of the oblique edge 22. The shape of the upper horizontal edge 24 is identical or substantially identical to that of the upper horizontal edge 16 on the first shade plate 11, and located on the left of the oblique edge 22.

An operational mechanism of the vehicle headlight 1 according the first embodiment is described below.

When the discharge lamp 2 is lights up, light L1 is emitted from the light emitting portion 7 in the discharge lamp 2. A portion of the light L1 is reflected toward the shade 5 and the projector lens 4 by the reflecting surface of the reflector 3. A portion of a reflected light L2 is blocked by the first shade plate 11. The rest of the reflected light L2 is reflected toward the second shade plate 12.

Figure 7:
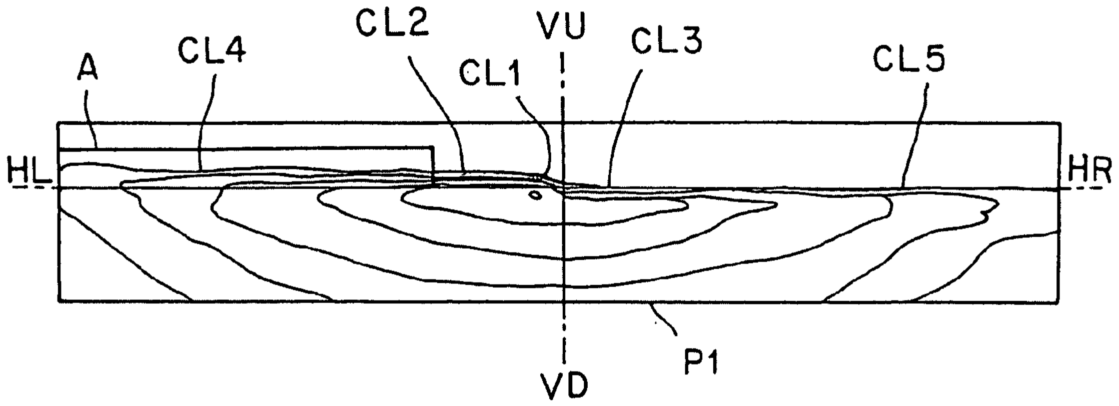
FIG. 7 is a schematic of a light distribution pattern that is obtained by using the first shade plate shown in FIGS. 1 and 2.

At this time, a light distribution pattern P1 is created by using the first shade plate 11 (see FIG. 7). In the light distribution pattern P1, the oblique cut-off line CL1, the upper-horizontal cut-off line CL2, the lower-horizontal cut-off line CL3, a left-side oblique cut-off line CL4, and a right-side oblique cut-off line CL5 are respectively created by the oblique edge 14, the lower horizontal edge 15, the upper horizontal edge 16, the right-side oblique edge 17, and the left-side oblique edge 18.

The right-side oblique edge 17 and the left-side oblique edge 18 on the first shade plate 11 are respectively located obliquely downward from the right of the lower horizontal edge 15 and the left of the upper horizontal edge 16. Therefore, the left-side oblique cut-off line CL4, which is located on the left of the upper-horizontal cut-off line CL2, is located above an extension of the upper-horizontal cut-off line CL2 (see the cut-off line in the rectangular frame A shown in FIG. 7). The right-side oblique cut-off line CL5, which is located on the right of the lower-horizontal cut-off line CL3, is located above an extension of the lower-horizontal cut-off line CL3. Thus, in the light distribution pattern P1, it is possible to increase the amount of light around the horizontal line HL-HR corresponding to the left-side oblique cut-off line CL4 and the right-side oblique cut-off line CL5 (see the area surrounded by the rectangular frame A shown in FIG. 7).

However, the left-side oblique cut-off line CL4 and the right-side oblique cut-off line CL5 may cause glare at both sides of the light distribution pattern P1. To prevent the glare, the second shade plate 12 is provided.

A portion of the reflected light L2 is blocked by the first shade plate 11, and a portion of the rest of the reflected light L2, which is not blocked by the first shade plate 11, is further blocked by the second shade plate 12, thereby creating the light distribution pattern P1. The rest of the reflected light L2, which is not blocked by the first shade plate 11 and the second shade plate 12, is further reflected toward the projector lens 4.

At this time, a certain light distribution pattern, i.e., the light distribution pattern for oncoming cars LP as shown in FIG. 8 is created by using the second shade plate 12. In the light distribution pattern for oncoming cars LP, the oblique cut-off line CL1, the upper-horizontal cut-off line CL2, and the lower-horizontal cut-off line CL3 are respectively created by the oblique edge 22, the lower horizontal edge 23, and the upper horizontal edge 24 on the second shade plate 12.

The second shade plate 12 is formed by the center plate portion 19, the right-side plate portion 20, and the left-side plate portion 21, thereby having the approximately similar shape to the meridional image surface 9 of the projector lens 4. Therefore, it is possible to make the oblique cut-off line CL1, the upper-horizontal cut-off line CL2, and the lower-horizontal cut-off line CL3 in the light distribution pattern for oncoming cars LP clear (see the cut-off line in the rectangular frame A shown in FIG. 8).

The shapes of the lower horizontal edge 23 and the upper horizontal edge 24 on the second shade plate 12 are respectively identical or substantially identical to that of the lower horizontal edge 15 and the upper horizontal edge 16 on the first shade plate 11. Therefore, in the light distribution pattern P1 as shown in FIG. 7, a portion around or above the horizontal line HL-HR corresponding to the left-side oblique cut-off line CL4 and the right-side oblique cut-off line CL5 is blocked by a portion corresponding to the lower horizontal edge 23 and the upper horizontal edge 24 on the second shade plate 12, thereby creating the upper-horizontal cut-off line CL2 and the lower-horizontal cut-off line CL3 in the light distribution pattern for oncoming cars LP (see the cut-off line in the rectangular frame A shown in FIG. 8). Thus, it is possible to keep enough amount of light even on or around the left end of the upper-horizontal cut-off line CL2 and the right end of the lower-horizontal cut-off line CL3 in the light distribution pattern for oncoming cars LP (see the area surrounded by the rectangular frame A shown in FIG. 8).

The rest of the reflected light L2, which is not blocked by the first shade plate 11 and the second shade plate 12, is further reflected toward the projector lens 4, thereby creating the light distribution pattern for oncoming cars LP. The rest of the reflected light L2 is projected (radiated, emitted) forward the car C via the projector lens 4 in the light distribution pattern for oncoming cars LP as shown in FIG. 8.

Effects of the vehicle headlight 1 are described below.

Figure 9:
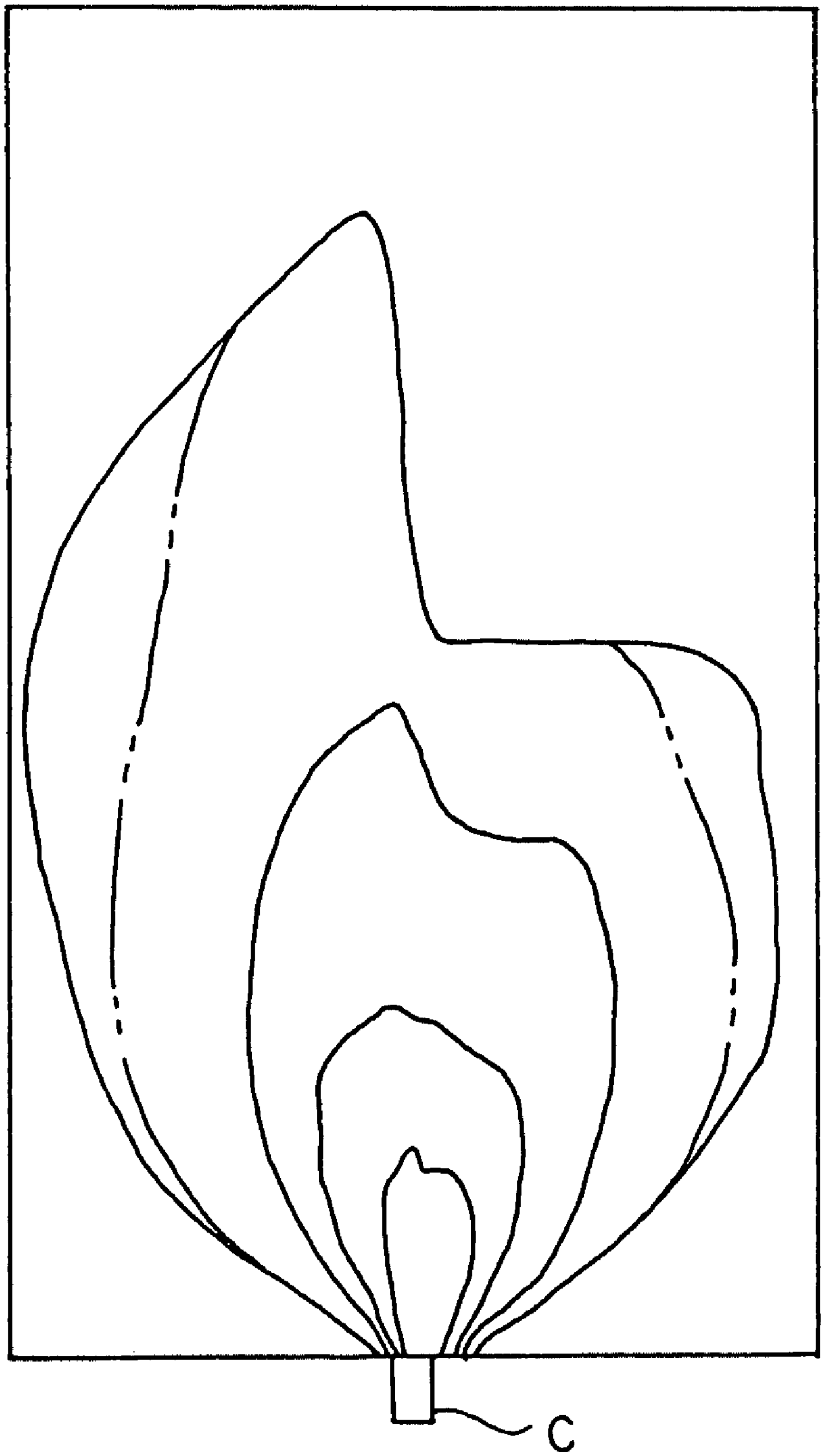
FIG. 9 is a schematic of an isolux curve of the light distribution pattern for oncoming cars shown in FIG. 8.

The vehicle headlight 1 can achieve to increase the amount of light around the cut-off line in the light distribution pattern for oncoming cars LP, more particularly, around the left end of the upper-horizontal cut-off line CL2 (see the light distribution pattern in the area surrounded by the rectangular frame A shown in FIG. 8) and the right end of the lower-horizontal cut-off line CL3, because the first shade plate 11 has the right-side oblique edge 17 and the left-side oblique edge 18. As shown in FIG. 9, an iso-illuminance curve (an iso-intensity curve) obtained by using the vehicle headlight 1, which is indicated by a solid line (the outermost solid line), is extended wider than the same for the conventional vehicle headlight, which is indicated by a dashed-two dotted line. In other words, according to the vehicle headlight 1, it is possible to increase the amount of light around the left end of the upper-horizontal cut-off line CL2 and the right end of the lower-horizontal cut-off line CL3, because the right-side oblique edge 17 and the left-side oblique edge 18 are provided on the top surface of the first shade plate 11.

Moreover, according to the vehicle headlight 1, it is possible to make the oblique cut-off line CL1, the upper-horizontal cut-off line CL2, and the lower-horizontal cut-off line CL3 in the light distribution pattern for oncoming cars LP clear, because the oblique edge 22, the lower horizontal edge 23, and the upper horizontal edge 24 are respectively provided on the center plate portion 19, the right-side plate portion 20, and the left-side plate portion 21 of the second shade plate 12, which has the approximately similar shape to the meridional image surface 9 of the projector lens 4.

Furthermore, according to the vehicle headlight 1, in the light distribution pattern P1 as shown in FIG. 7, a portion around or above the horizontal line HL-HR corresponding to the left-side oblique cut-off line CL4 and the right-side oblique cut-off line CL5 can be blocked by a portion corresponding to the lower horizontal edge 23 and the upper horizontal edge 24 on the second shade plate 12, because the shapes of the lower horizontal edge 15 and the upper horizontal edge 16 on the first shade plate 11 are respectively identical or substantially identical to that of the lower horizontal edge 23 and the upper horizontal edge 24 on the second shade plate 12.

Furthermore, because the vehicle headlight 1 includes the first shade plate 11 and the second shade plate 12, it is possible to increase the amounts of light around the left end of the upper-horizontal cut-off line CL2 and the right end of the lower-horizontal cut-off line CL3 thereby preventing the generation of glare that flashes oncoming vehicles and leading vehicles.

Furthermore, although the production costs are less, the vehicle headlight 1 can increase the amounts of light around the left end of the upper-horizontal cut-off line CL2 and the right end of the lower-horizontal cut-off line CL3 thereby preventing the generation of glare reliably.

A vehicle headlight 100 according to a second embodiment of the present invention is described in detail below with reference to FIGS. 10 to 15. The portions identical to those in FIGS. 1 to 9 are denoted with the same reference numerals and the description of those portions is omitted. The vehicle headlight 100 is, for example, a projector-type headlamp, and provided to the right and left sides of a front face of the car (vehicle) C.

Figure 10:
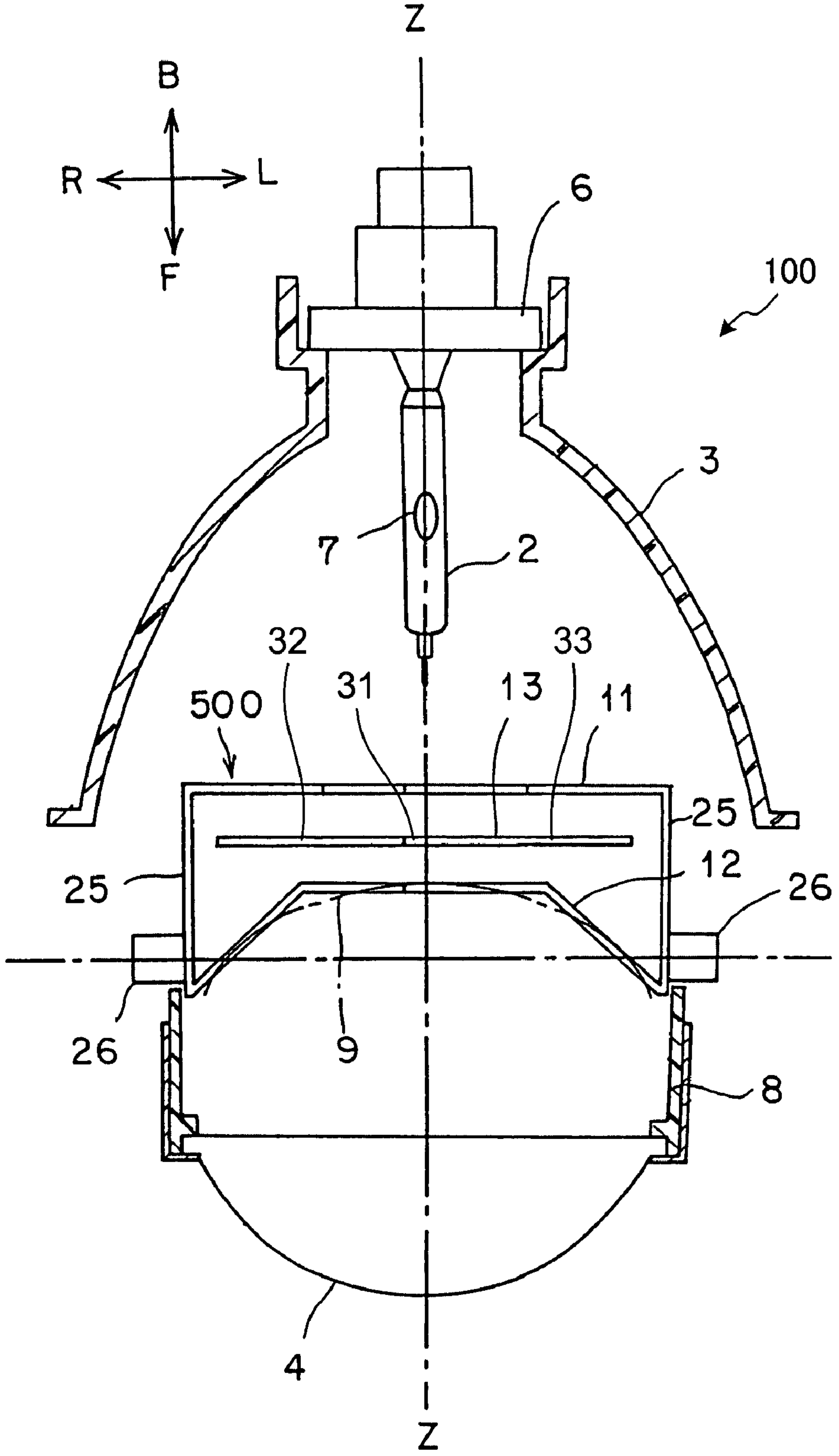
FIG. 10 is a horizontal cross-sectional view of a vehicle headlight according to a second embodiment of the present invention.
Figure 11:
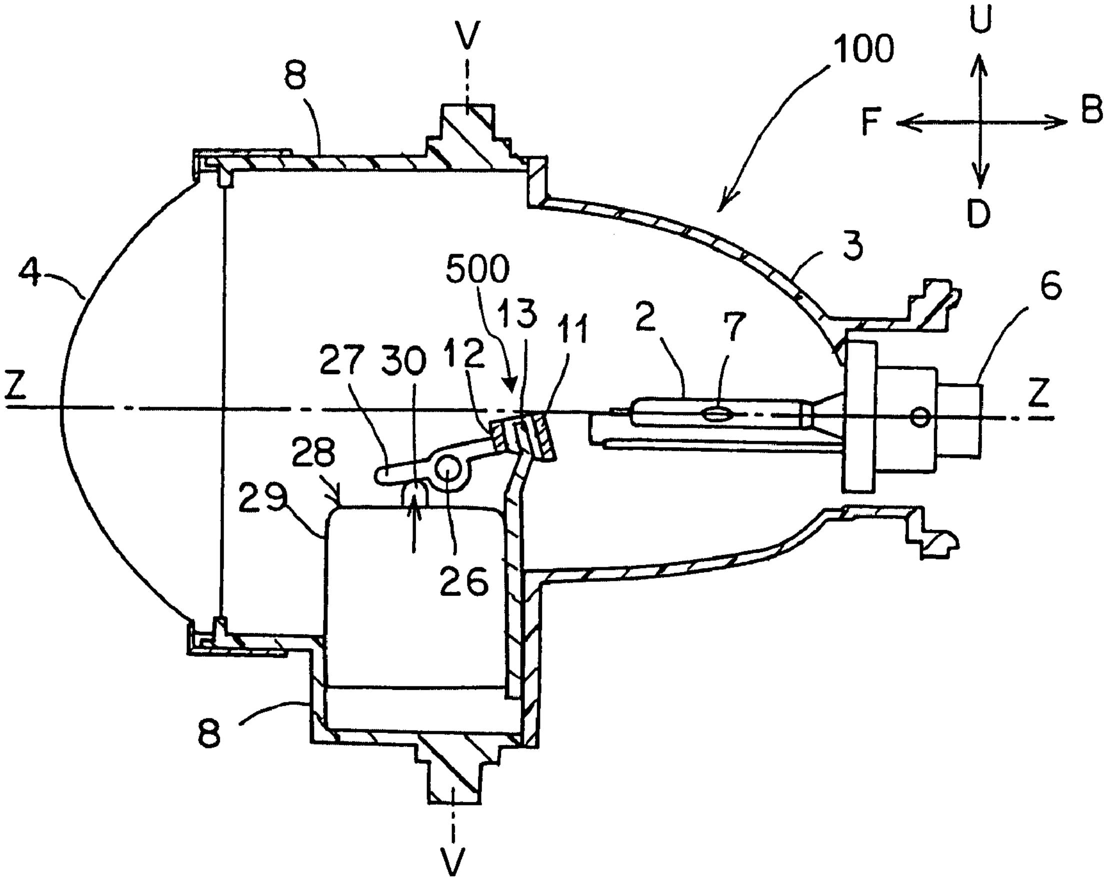
FIG. 11 is a vertical cross-sectional view of the vehicle headlight according to the second embodiment.
Figure 14:
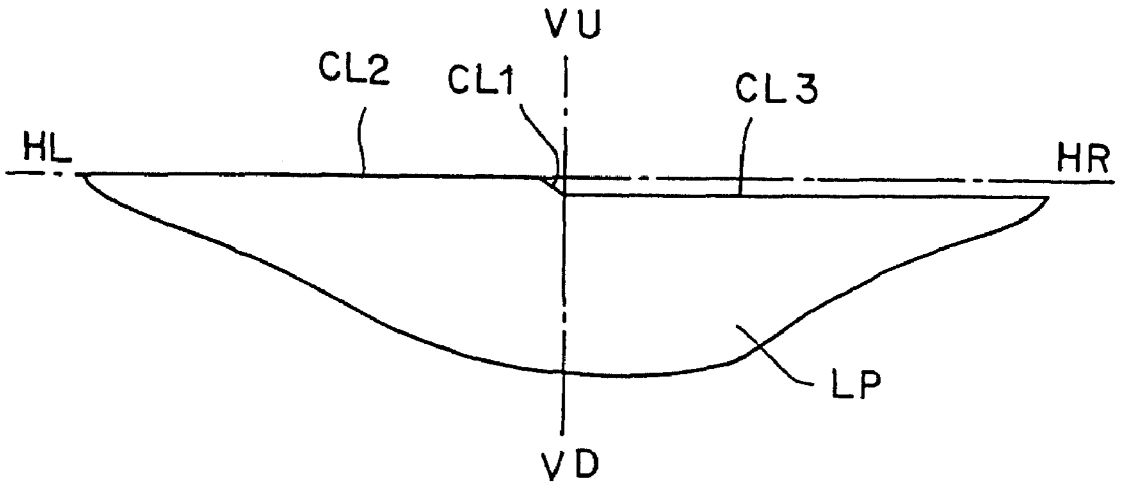
FIG. 14 is a schematic of a light distribution pattern for oncoming cars obtained by using the first and second shade plates shown in FIG. 12.
Figure 15:
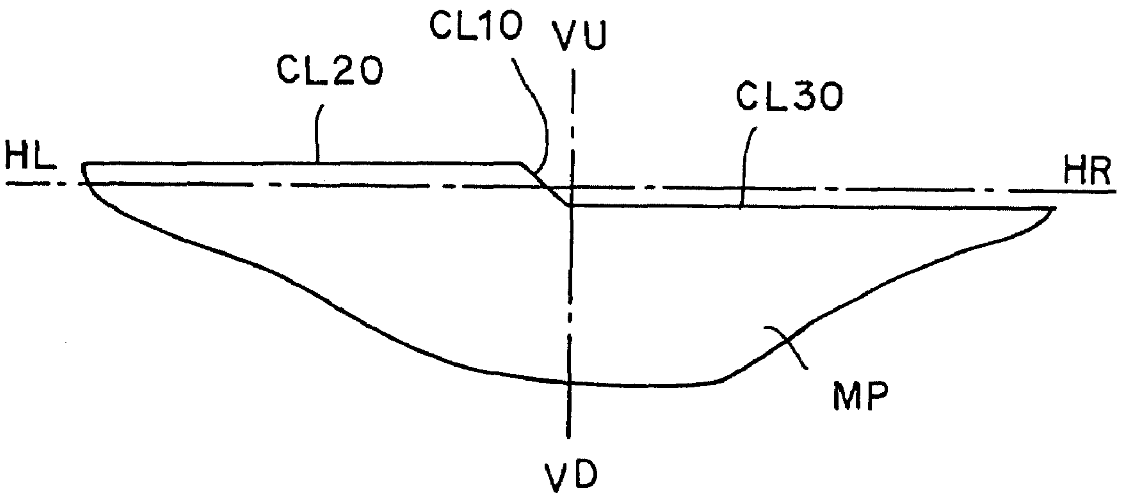
FIG. 15 is a schematic of a light distribution pattern for expressways obtained by using the third shade plate shown in FIG. 12.

The vehicle headlight 100 lights by switching between two light distribution patterns, either in the certain light distribution pattern including the cut-off lines CL1, CL2, and CL3 at its upper edge, i.e., the light distribution pattern for oncoming cars LP (see FIG. 14) or in a light distribution pattern for expressways MP (see FIG. 15). The light distribution pattern for expressways MP includes cut-off lines CL10, CL20, and CL30. The cut-off line CL20 is located slightly above the horizontal line HL-HR. As shown in FIGS. 10 and 11, the vehicle headlight 100 includes the discharge lamp 2 as the light source, the reflector 3, the projector lens (the condenser lens) 4, and a shade 500.

The shade 500 includes the first shade plate 11, the second shade plate 12, and a third shade plate 13. The first shade plate 11 and the second shade plate 12 are identical to those in the first embodiment.

The first, second, and third shade plates 11 to 13 are made of, for example, a flat thin steel sheet which thickness is in the range of 1 to 3 millimeters to reduce the production costs. The first shade plate 11 and the second shade plate 12 are integrated via side plates 25 at both ends with keeping a distance from each other. The frame member 8 is secured to a rotating shaft 26. The first shade plate 11 and the second shade plate 12 are rotatably attached to the rotating shaft 26 via the side plates 25. The first shade plate 11 and the second shade plate 12 include a convex portion 27 that is located in front of the rotating shaft 26.

The third shade plate 13 is arranged between the first shade plate 11 and the second shade plate 12 with keeping a distance among the shade plates, and secured to the frame member 8. The third shade plate 13 has edges on its top surface, thereby creating the cut-off lines CL10, CL20, and CL30 in the light distribution pattern for expressways MP. The edges are an oblique edge 31, a lower horizontal edge 32, and an upper horizontal edge 33. The oblique edge 31 forms the oblique cut-off line CL10, and the lower horizontal edge 32 forms the upper-horizontal cut-off line CL20, and the upper horizontal edge 33 forms the lower-horizontal cut-off line CL30 in the light distribution pattern for expressways MP.

An intersection of the oblique edge 31 and the upper horizontal edge 33 on the third shade plate 13, i.e., the shape and the elevation of an elbow point of the third shade plate 13 is identical or substantially identical to the same for the first shade plate 11 and the second shade plate 12, and located on or near the intersection of the vertical line VU-VD and the horizontal line HL-HR. The lower horizontal edge 32 is located on the right of the oblique edge 31. The upper horizontal edge 33 is located on the left of the oblique edge 31.

The first shade plate 11 and the second shade plate 12 include a switching unit 28 that changes positions of the first shade plate 11 and the second shade plate 12 thereby switching between the light distribution pattern for oncoming cars LP and the light distribution pattern for expressways MP.

The switching unit 28 includes a solenoid 29 and a spring (not shown). The solenoid 29 is secured to the frame member 8. A plunger 30 included in the solenoid 29 contacts with the convex portion 27. The spring constantly biases the first shade plate 11 and the second shade plate 12 in a direction indicated by an arrow shown in FIG. 12 (in a counterclockwise direction).

An operational mechanism of the vehicle headlight 100 is described below.

Figure 12:
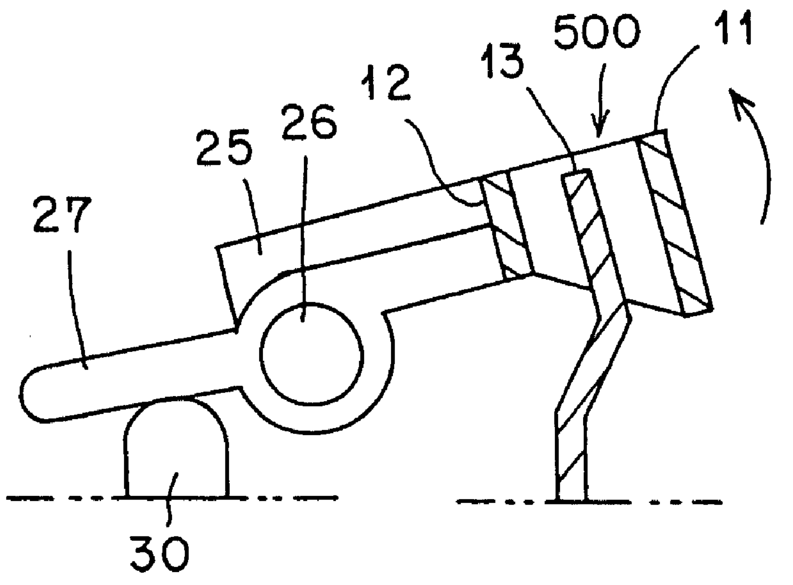
FIG. 12 depicts states of first, second, and third shade plates shown in FIGS. 10 and 11 when a solenoid curries no current.

When the solenoid 29 curries no current, the state (positions) of the first, second, and third shade plates 11 to 13 is as shown in FIG. 12. Namely, the edges 14 to 18 of the first shade plate 11 and the edges 22 to 24 of the second shade plate 12 are located above the edges 31 to 33 of the third shade plate 13 because the spring biases the first shade plate 11 and the second shade plate 12. In this state, the discharge lamp 2 is turned on, and the light distribution pattern for oncoming cars LP as shown in FIG. 14 is obtained in the same manner as in the first embodiment.

Figure 13:
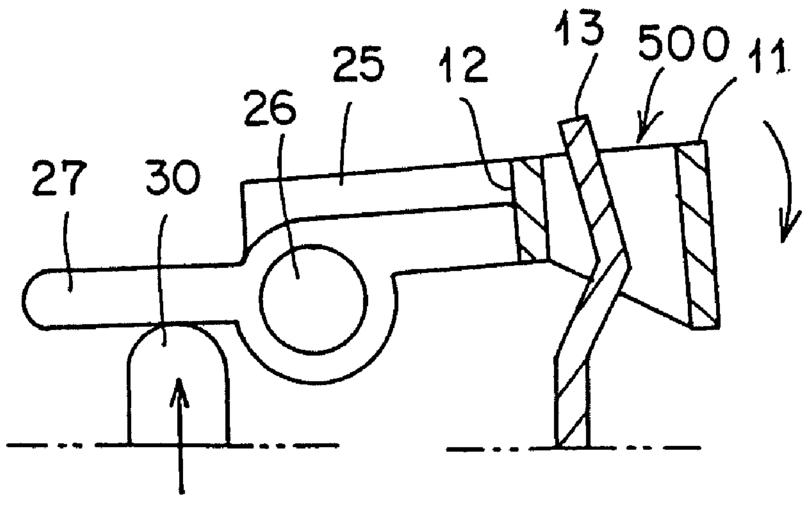
FIG. 13 depicts states of the first, second, and third shade plates shown in FIG. 12 when the solenoid curries current.

When the solenoid 29 curries current, the plunger 30 is lifted up against the bias force of the spring as indicated by an up-pointing arrow shown in FIG. 13. Then, the first shade plate 11 and the second shade plate 12 rotate around the rotating shaft 26 in a direction indicated by a down-pointing arrow as shown in FIG. 13 (in a clockwise direction). The edges 14 to 18 of the first shade plate 11 and the edges 22 to 24 of the second shade plate 12 are located below the edges 31 to 33 of the third shade plate 13. As a result, a portion of the reflected light from the reflector 3 is blocked by the third shade plate 13, the rest of the reflected light lights in front of the car C via the projected lens 4 in the light distribution pattern for expressways MP as shown in FIG. 15.

When the current through the solenoid 29 is cut off, the first shade plate 11 and the second shade plate 12 rotate around the rotating shaft 26 in the direction indicated by the arrow shown in FIG. 12 (in the counterclockwise direction) by the bias force of the spring, and the plunger 30 is descended. The edges 14 to 18 of the first shade plate 11 and the edges 22 to 24 of the second shade plate 12 are located above the edges, 31 to 33 of the third shade plate 13, thereby switching from the light distribution pattern for expressways MP as shown in FIG. 15 to the light distribution pattern for oncoming cars LP as shown in FIG. 14.

Effects of the vehicle headlight 100 according to the second embodiment are described below.

The vehicle headlight 100 can achieve the approximately same effects as the vehicle headlight 1 according to the first embodiment. The effect of the vehicle headlight 100 is different from the same for the vehicle headlight 1 in the following points. The vehicle headlight 100 includes not only the first shade plate 11 and the second shade plate 12 but also the third shade plate 13, thereby obtaining the light distribution pattern for oncoming cars LP including the cut-off lines CL1, CL2, and CL3 by using the first shade plate 11 and the second shade plate 12 and the light distribution pattern for expressways MP including the cut-off lines CL10, CL20, and CL30 by using the third shade plate 13. The vehicle headlight 100 can switch between the light distribution pattern for oncoming cars LP and the light distribution pattern for expressways MP by changing the positions of the first shade plate 11 and the second shade plate 12 with the switching unit 28. Moreover, the second shade plate 12 is bent to have the approximately similar shape to the meridional image surface 9 of the projector lens 4. Therefore, it is enough to check a clearance between the center plate portion 19 of the second shade plate 12 and a center portion of the third shade plate 13 those are located at the minimum distance (see FIG. 13), i.e., whether the second shade plate 12 interferes in the third shade plate 13 when the positions of the first shade plate 11 and the second shade plate 12 are changed. In other words, the production design of the shade 500 can be simplified. Thus, the vehicle headlight 100 can reduce the production costs even though the third shade plate 13 is added to obtain the light distribution pattern for expressways MP. Furthermore, the vehicle headlight 100 can increase the amount of light of the light distribution pattern for oncoming cars LP by using the first shade plate 11 and the second shade plate 12, thereby creating the cut-off lines CL1, CL2, and CL3 more clearly.

Variants of the first and second embodiments are described below. As an example of the vehicle headlight, the headlamp is explained in the first and second embodiments, but not limited to the headlamp. The vehicle headlight according to the embodiments can apply to, for example, a fog lamp.

The projector-type headlamp in the second embodiment obtains the light distribution pattern for oncoming cars LP and the light distribution pattern for expressways MP by changing the positions of the first shade plate 11 and the second shade plate 12. Alternatively, the projector-type headlamp according to the second embodiment can obtain the light distribution pattern for oncoming cars LP and, for example, a light distribution pattern for wet road.

The solenoid 29 is used as the switching unit 28 in the second embodiment, but the switching unit 28 is not limited to the solenoid. It is also possible to use a stepping motor, a normal motor, or a cylinder instead of the solenoid.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projector-type vehicle headlight comprising:

a light source that emits light;

a reflector that reflects the light emitted by the light source;

a projector lens that projects forward the light reflected by the reflector; and a shade member that blocks a portion of the light reflected by the reflector so that the light does not reach to the projector lens thereby creating a light distribution pattern that includes cut-off lines, wherein the shade member includes at least a first plate member and a second plate member, the first plate member being located relatively nearer to the reflector and the second plate member being located relatively nearer to the projector lens, the first plate member has an edge that increases amounts of light around the cut-off lines of the light distribution pattern, the second plate member is bent to have an approximately similar shape to a meridional image surface of the projector lens, and has an edge that creates the cut-off lines of the light distribution pattern, the light distribution pattern is a light distribution pattern for oncoming vehicles that includes an oblique cut-off line, an upper-horizontal cut-off line, and a lower-horizontal cut-off line, the oblique cut-off line being located between the upper-horizontal cut-off line and the lower-horizontal cut-off line, the upper-horizontal cut-off line and the lower-horizontal cut-off line being located on either side of the oblique cut-off line, the first plate member has an edge on a top surface of the first plate member, the edge of the first plate member includes an oblique partial edge, a lower-horizontal partial edge, an upper-horizontal partial edge, a first oblique partial edge, and a second oblique partial edge, the oblique partial edge creating the oblique cut-off line of the light distribution pattern for oncoming vehicles, the lower-horizontal partial edge creating the upper-horizontal cut-off line of the light distribution pattern for oncoming vehicles, the upper-horizontal partial edge creating the lower-horizontal cut-off line of the light distribution pattern for oncoming vehicles, the first oblique partial edge being located obliquely downward from a side of the lower-horizontal partial edge thereby increasing an amount of light around the upper-horizontal cut-off line, the second oblique partial edge being located obliquely downward from a side of the upper-horizontal partial edge thereby increasing an amount of light around the lower-horizontal cut-off line, the second plate member includes a center plate member, a first side plate member, and a second side plate member, the first side plate member and the second side plate member being bent from the center plate member toward the projector lens, the second plate member has an edge on a top surface of the second plate member thereby creating the oblique cut-off line, the upper-horizontal cut-off line, and the lower-horizontal cut-off line of the light distribution pattern for oncoming vehicles, and the edge of the second plate member includes an oblique partial edge, a lower-horizontal partial edge, and an upper-horizontal partial edge, a shape of the oblique partial edge being identical or substantially identical to that of the oblique partial edge of the first plate member and creating the oblique cut-off line of the light distribution pattern for oncoming vehicles, a shape of the lower-horizontal partial edge being identical or substantially identical to that of the lower-horizontal partial edge of the first plate member and creating the upper-horizontal cut-off line of the light distribution pattern for oncoming vehicles, a shape of the upper-horizontal partial edge being identical or substantially identical to that of the upper-horizontal partial edge of the first plate member and creating the lower-horizontal cut-off line of the light distribution pattern for oncoming vehicles.

2. The vehicle headlight according to claim 1, wherein the shade member includes the first plate member, the second plate member, and a third plate member, the third plate member is secured between the first plate member and the second plate member with keeping a distance from the first plate member and the second plate member respectively, the first plate member and the second plate member are integrated into a rotatable combined plate member, and the combined plate member includes a switching unit that switches between the light distribution pattern for oncoming vehicles that includes the oblique cut-off line, the upper-horizontal cut-off line, the lower-horizontal cut-off line and a second light distribution pattern that is obtained by using the third plate member by changing a position of the combined plate member.

3. The vehicle headlight according to claim 2, wherein the second light distribution pattern obtained by using the third plate member is a light distribution pattern for expressways that includes an oblique cut-off line, an upper-horizontal cut-off line, and a lower-horizontal cut-off line, the oblique cut-off line being located between the upper-horizontal cut-off line and the lower-horizontal cut-off line, the upper-horizontal cut-off line and the lower-horizontal cut-off line being located on either side of the oblique cut-off line, the third plate member has an edge on a top surface of the third plate member, and the edge of the third plate member includes an oblique partial edge, a lower-horizontal partial edge, and an upper-horizontal partial edge, the oblique partial edge creating the oblique cut-off line of the light distribution pattern for expressways, the lower-horizontal partial edge creating the upper-horizontal cut-off line of the light distribution pattern for expressways, the upper-horizontal partial edge creating the lower-horizontal cut-off line of the light distribution pattern for expressways.

4. A projector-type vehicle headlight comprising:

a light source that emits light;

a reflector that reflects the light emitted by the light source;

a projector lens that projects forward the light reflected by the reflector; and a shade member that blocks a portion of the light reflected by the reflector so that the light does not reach to the projector lens thereby creating a light distribution pattern that includes cut-off lines, wherein the shade member includes at least a first plate member and a second plate member, the first plate member being located relatively nearer to the reflector and the second plate member being located relatively nearer to the projector lens, the first plate member has an edge that increases amounts of light around the cut-off lines of the light distribution pattern, the second plate member is bent to have an approximately similar shape to a meridional image surface of the projector lens, and has an edge that creates the cut-off lines of the light distribution pattern, the shade member includes the first plate member, the second plate member, and a third plate member, the third plate member is secured between the first plate member and the second plate member with keeping a distance from the first plate member and the second plate member respectively, the first plate member and the second plate member are integrated into a rotatable combined plate member, and the combined plate member includes a switching unit that switches between the light distribution pattern for oncoming vehicles that includes the oblique cut-off line, the upper-horizontal cut-off line, the lower-horizontal cut-off line and a second light distribution pattern that is obtained by using the third plate member by changing a position of the combined plate member.

* * * * *